United States Patent
de Wilde et al.

(10) Patent No.: US 12,506,192 B2
(45) Date of Patent: Dec. 23, 2025

(54) THERMAL BLOCKING SHEET

(71) Applicant: Illinois Tool Works Inc., Glenview, IL (US)

(72) Inventors: Ignatius de Wilde, Kortgene (NL); Kevin Wegmann, Wuppertal (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 657 days.

(21) Appl. No.: 17/880,297

(22) Filed: Aug. 3, 2022

(65) Prior Publication Data

US 2023/0039138 A1 Feb. 9, 2023

(30) Foreign Application Priority Data

Aug. 5, 2021 (EP) .................................. 21189948
Aug. 1, 2022 (EP) .................................. 22188174

(51) Int. Cl.
  *H01M 10/6555* (2014.01)
  *H01M 10/658* (2014.01)
  *H01M 50/289* (2021.01)

(52) U.S. Cl.
  CPC ..... *H01M 10/6555* (2015.04); *H01M 10/658* (2015.04); *H01M 50/289* (2021.01); *H01M 2220/20* (2013.01)

(58) Field of Classification Search
  CPC ........... H01M 10/6555; H01M 10/658; H01M 50/593; H01M 50/289
  See application file for complete search history.

(56) References Cited

U.S. PATENT DOCUMENTS

| 2019/0190098 A1 | 6/2019 | Abe |
| 2020/0365853 A1 | 11/2020 | Hashimoto |
| 2022/0158292 A1 | 5/2022 | Harazuka |

FOREIGN PATENT DOCUMENTS

| WO | 2020054228 | 3/2020 | |
| WO | 2020194929 | 10/2020 | |
| WO | WO-2020194929 A1 * | 10/2020 | .......... H01M 10/613 |

OTHER PUBLICATIONS

Europe Patent Office, Extended European Search Report, Application No. 22188174.1, dated Dec. 13, 2022, 7 pages.
European Patent Office, Office Action, Application No. 22188174.1, dated Jan. 2, 2025, 7 pages.

* cited by examiner

*Primary Examiner* — Sarah A. Slifka
(74) *Attorney, Agent, or Firm* — McAndrews, Held & Malloy, Ltd.

(57) ABSTRACT

The present disclosure provides a thermal blocking sheet (2) for a battery, and a method of manufacturing a thermal blocking sheet for a battery. The thermal blocking sheet includes a frame (3) comprising one or more frame elements configured to resist compression of the sheet, and thermal insulation (4) located within the frame. The method includes forming a frame comprising one or more frame elements configured to resist compression of the sheet, and disposing thermal insulation within the frame.

10 Claims, 2 Drawing Sheets

THERMAL BLOCKING SHEET

TECHNICAL FIELD

This disclosure relates generally to a thermal blocking sheet for a battery. Particularly, the thermal blocking sheet is for use adjacent to at least one cell, such as between a pair of cells for between a single cell and a battery housing, to limit the spread of excess heat or fire. In certain examples, the thermal blocking sheet also resists pressure from cells on either side, due to cell expansion.

BACKGROUND

It is known that in certain situations a battery may over heat, and possibly catch fire. Lithium-ion batteries are particularly susceptible to this; however the issue may arise with other battery types. Lithium-ion batteries are increasingly being used to power electric road vehicles, and it will be appreciated that in such a situation a large number of cells may be packed into a relatively small volume, which increases the risk of overheating. Known techniques for mitigating this risk of overheating or fire fall essentially into two types. A first type comprises controlling the battery or the cell to avoid the risk of overheating in the first place, for instance by limiting charging current to a battery within acceptable limits. A second type comprises incorporating structures into or around the battery to manage an overheating event, for instance by constraining overheating to a single cell, which may then be replaced.

A known battery cell level approach to improve battery safety is to use materials with intrinsically better thermal properties in the construction of the cell. This may include flexible ceramic separators within a battery cell to limit the spread of overheating through the cell and to prevent separator failure, which could lead to an uncontrolled cell overheating event.

A known battery module level approach is to design battery modules so that it is difficult for heat to be transferred between the cells. This can include having open space between the cells (for instance around 1.4 mm, which also accommodates typical cell expansion), using heat shields or insulators (such as Formex or a mica layer), cooling plates, heat conductors and flame-retardant barriers.

A known battery pack level approach is to apply similar techniques noted above for the battery module to the whole battery pack, for instance heat transfer barriers between modules, strategic vents in the battery pack wall and having dedicated cooling systems. A large battery system can be divided into several smaller packs that are thermally isolated from one another, which guards against the risk of large-scale thermal blocking.

Despite considerable research into the fire risk for lithium-ion batteries, the problem has not been fully resolved and fires continue to occur, risking harm to vehicle occupants when the batteries power an electric vehicle, along with property damage.

Furthermore, in certain situations a battery cell may expand. This may occur through use or with age of the battery cell, and normally is undesirable. For a lithium-ion cell, as it ages, gas can be created (referred to as outgassing) causing the cell to expand if there is no outlet for the gas. Excessive expansion may physically damage the cell or adjacent cells or other structures. It may also lead to the cell overheating or catching fire.

It is an aim of certain examples of the present disclosure to provide an improved technique for guarding against the risk of fire or uncontrolled overheating for a battery. A further aim is to mitigate the effects of cell expansion in a battery.

BRIEF SUMMARY

According to a first aspect of the present disclosure there is provided a thermal blocking sheet, the thermal blocking sheet comprising: a frame comprising one or more frame elements configured to resist compression of the sheet; and thermal insulation located within the frame.

According to a second aspect of the present disclosure there is provided a battery comprising: a plurality of cells; and a thermal blocking sheet according to any one of the preceding claims between a pair of cells.

According to a third aspect of the present disclosure there is provided a method of manufacturing a thermal blocking sheet, the method comprising: forming a frame comprising one or more frame elements configured to resist compression of the sheet; and disposing thermal insulation within the frame.

An advantage of examples of the present disclosure is that the thermal blocking sheet limits the spread of heat while also resisting external pressure. In one example, the thermal blocking sheet is used to limit the spread of heat between battery cells and to resist cell expansion from the cells on either side. Advantageously, the different functions of pressure resistance and thermal insulation are provided by different portions of the thermal blocking sheet, which permits optimal materials to be selected for each role. Additionally, selection of the relative size of each part of the sheet (along with material selection) allows fine control over the thermal insulation and pressure resistance provided.

For the avoidance of doubt, any of the features described herein apply equally to any aspect of the disclosure.

BRIEF DESCRIPTION OF THE DRAWINGS

Embodiments of the disclosure will now be described by way of example only with reference to the accompanying drawings in which.

DETAILED DESCRIPTION

Examples of the present disclosure relate to a thermal blocking sheet, a battery including a thermal blocking sheet adjacent to at least one cell and a method of manufacturing a thermal blocking sheet.

Figure 1:
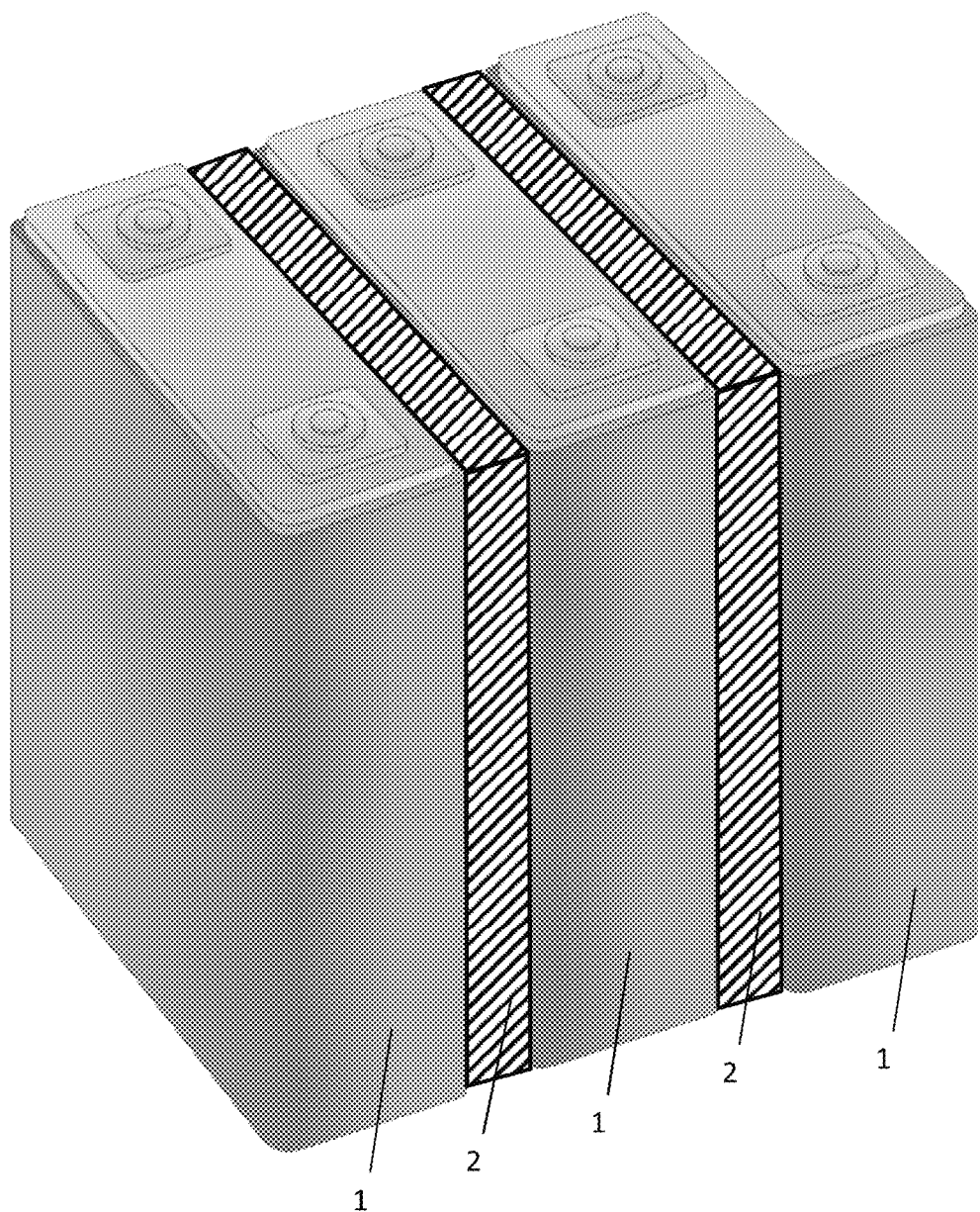
FIG. 1 is a perspective view of a battery including battery cells and thermal blocking sheets according to an example of the present disclosure positioned between the cells.

Referring to FIG. 1, this illustrates a battery or a battery module comprising three cells 1. It will be understood that the choice of three cells 1 is arbitrary and there may be two or more cells 1. The cells 1 are illustrated as prismatic battery cells. Prismatic cells have the advantage that their shape permits cells to be tightly packed into a battery module; however, the present disclosure is not limited to prismatic cells or any particular cell form. Between each pair of cells 1 there is provided a thermal blocking sheet 2. The battery of FIG. 1 may be part of an electrical vehicle. Or it may be domestic, commercial or industrial battery, for instance part of a home appliance. The present disclosure is not limited to any particular application for the battery.

Figure 2:
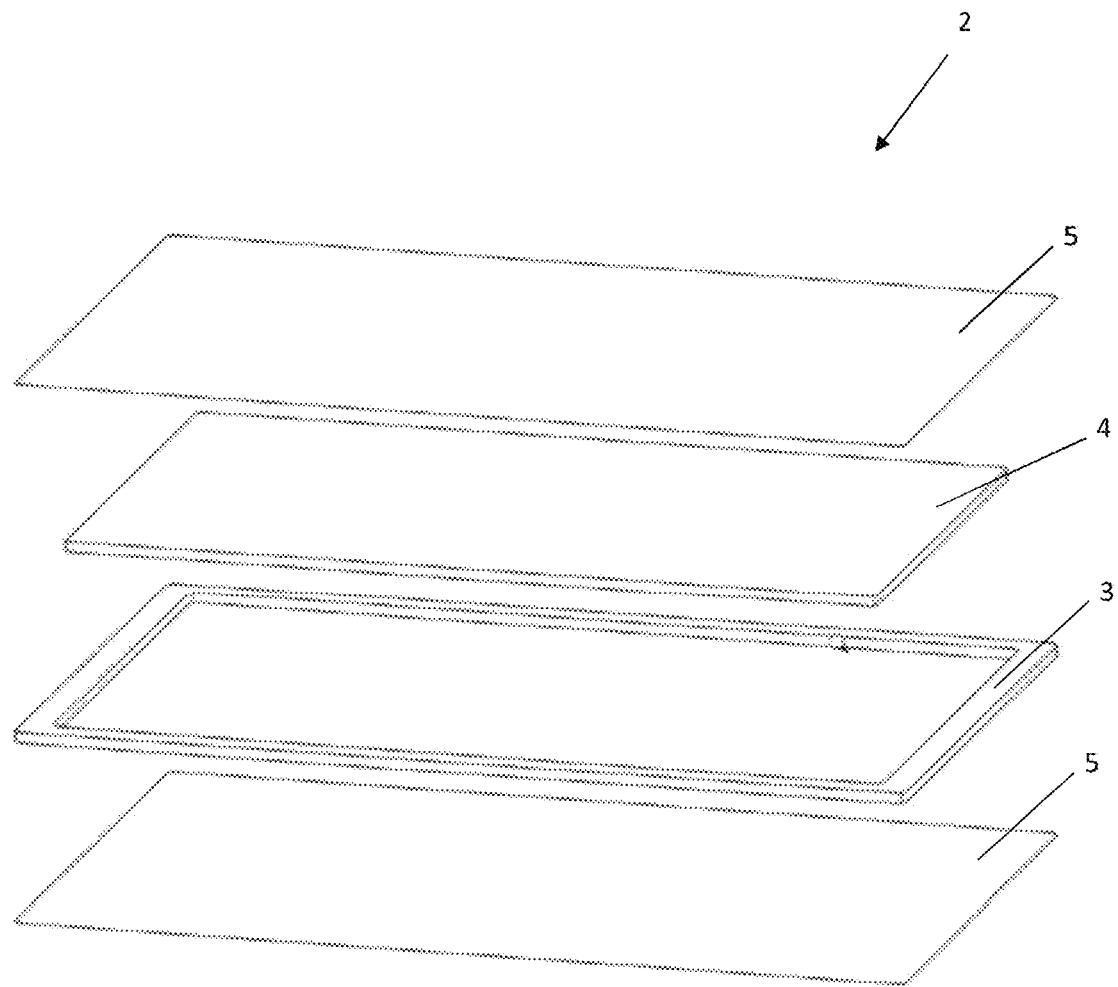
FIG. 2 is an exploded perspective view of a thermal blocking sheet according to an example of the present disclosure.

The term "sheet" should not be used to infer any dimensions: it may be provided in the form of a roll of tape. In FIG. 1 the thermal blocking sheet 2 extends across the full facing areas of adjacent cells 1 though it may be larger or smaller than the adjacent cells 1. Clearly where different forms of cells are used the size and shape of thermal blocking sheet will also vary. In other examples the thermal blocking sheet 2 may be located with a cell only on one side, for instance between a cell and a battery housing, FIG. 2 is an exploded perspective view of a thermal blocking sheet 2. The thermal blocking sheet 2 comprises two different parts, each optimised to perform a different role. The first part is a frame 3. The primary function of the frame 3 is to resist pressure from one or both sides of the sheet 2 (above and below in FIG. 2, or from at least one adjacent cell 1 in FIG. 1). That is, the material used to form frame 3 is selected to resist compression. The frame 3 in FIG. 2 is illustrated as a continuous O-shaped band around the outside of sheet 2, for instance in use extending about the periphery of the cells 1. Frame 3 may be cut from a continuous sheet of material. However, it will be appreciated that in alternative examples the frame 3 may be cut from separate strips forming frame elements that meet or approach each other at the corners of sheet 2 in order to be less wasteful of material. The term frame element should be understood to include any section or piece of the frame regardless of whether it is separately formed or a continuation of an adjacent frame element. In other examples the frame 3 may be spaced apart from the periphery of the sheet 2. Additionally, or alternatively, one or more frame elements may be provided in the form of intermediate ribs within an internal portion of the sheet 2. The frame elements may in some examples form a grid or matrix defining cells therebetween. The number of frame elements, their location and their dimensions may be selected to control the portions of sheet 2 where pressure resistance is provided and indeed the amount of pressure that the sheet 2 can resist. For example, the sheet of FIG. 2 may primarily provide pressure resistance about the periphery of the sheet, which may correspond to the periphery of battery cells. In other examples, pressure resistance may also be required in central portions. It will be appreciated that this is infinitely configurable, and that the cumulative pressure resistance afforded by the sheet 2 may be a function of the total surface area of frame 3 in the plane of the sheet 2 and the material from which the frame 3 is made.

In normal operating conditions within a battery, the thermal blocking sheet 2 may be required to resist pressure from an adjacent cell in a range of 1 kN to 4 kN. It will be understood that as cells expand the pressure may exceed 10 kN. The required pressure resistance is a parameter to be selected in order to specify a particular thermal blocking sheet 2.

Sheet 3 further comprises thermal insulation 4. Thermal insulation 4 is provided as a sheet that fits within frame 3. Where the frame 3 has a different shape, for instance the inclusion of an intermediate rib, it will be appreciated that the thermal insulation 4 may be provided in multiple portions. In some examples the frame 3 and thermal insulation 4 are contiguous and define the full area of the sheet 2. The primary function of the thermal insulation 4 is to provide thermal resistance, for instance to allow the sheet 2 to withstand a temperature gradient across the sheet 2 for a predetermined period of time. That is, there may be no constraint on material selection for the thermal insulation 4 to also resist crushing pressure. An example would be a requirement for the sheet to withstand a temperature differential across the sheet 2 of 150° C. for 350 s. The material used to form thermal insulation 4 is selected to provide this temperature resistance. Appropriate selection of the thermal insulation material, together with its dimensions including thickness, and the proportion of sheet 2 covered by thermal insulation 4 allows for the temperature resistance to be provided for substantially any specification.

It will be appreciated that according to examples of the present disclosure the different materials used may be selected separately from one another according to their required properties. As an example, a suitable thermal insulation material may be selected without the need to consider its ability to resist compression as that is provided separately by the frame. Considerable flexibility is provided to configure a thermal blocking sheet 2 with required properties according to selection of the respective materials, their locations within the sheet, the respective proportions of the overall sheet afforded to each material and the thickness of each material.

In some examples, it is possible to select a thermal insulation material that is cheaper than would be required if it was also required to resist compression. In some examples, the thermal insulation material may be fibrous or dusty, or otherwise liable to shed debris. In some examples of the present disclosure, as illustrated in FIG. 2, the thermal blocking sheet 2 further comprises top and bottom layers of film 5 to contain the thermal insulation 4. The film may adhere to or otherwise seal to frame 3 about the thermal insulation 4. The film layers 5 serve to contain the thermal insulation 4 within the frame 3. The film 5 improves the handling properties of the insulation material. Even where the thermal insulation 4 is not liable to shed debris, the film layers 5 serve to hold the frame 3 and the thermal insulation 4 together such that the sheet 2 may be used a single component. In some examples at least one film layer 5 may have an outer adhesive layer, for instance it may be a double-sided sticky tape, in order to apply the sheet 2 to a battery cell.

Suitably, the frame 3 may be formed from an elastomeric foam, for instance polyurethane. Suitably the thermal insulation 4 may comprise ceramics, silica-based fleeces, graphite or any other known insulation material. Suitably the film 5 may comprise a plastic or metal film. Film 5 may be flexible. The performance constraints on film 5 are less onerous than for frame 3 and thermal insulation 4 given that its primary function is to seal to frame 3 to contain the thermal insulation 4, which allows for a free choice of suitable materials. The person skilled in the art of thermal insulation, particularly for batteries, will be aware of numerous suitable materials for each part of the thermal blocking sheet 2, the selection of materials being a factor of the required pressure resistance and thermal insulation, available dimensions and cost.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the disclosure, whether or not these are expressly claimed. The applicant reserves the right to change any originally filed claim or file any new claim accordingly, including the right to amend any originally filed claim to depend from and/or incorporate any feature of any other claim although not originally claimed in that manner.

Throughout this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise. Throughout this specification, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers or characteristics described in conjunction with a particular aspect or example of the disclosure are to be understood to be applicable to any other aspect or example described herein unless incompatible therewith. All of the features disclosed in this specification, and/or all of the steps of any method or process so disclosed, may be combined in any combination, except combinations where at least some of such features and/or steps are mutually exclusive. The disclosure is not restricted to the details of any foregoing examples. The disclosure extends to any novel feature or combination of features disclosed in this specification. It will be also be appreciated that, throughout this specification, language in the general form of "X for Y" (where Y is some action, activity or step and X is some means for carrying out that action, activity or step) encompasses means X adapted or arranged specifically, but not exclusively, to do Y.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The reader's attention is directed to all papers and documents that are filed concurrently with or previous to this specification in connection with this application and which are open to public inspection with this specification, and the contents of all such papers and documents are incorporated herein by reference.

The invention claimed is:

1. A thermal blocking sheet for a battery, the thermal blocking sheet comprising:
 a frame comprising one or more frame elements configured to resist compression of the sheet; and
 thermal insulation located within the frame.

2. The thermal blocking sheet of claim 1, further comprising:
 first and second film layers sandwiching the frame and the thermal insulation therebetween.

3. The thermal blocking sheet of claim 2, wherein the first and second film layers are sealed to the frame.

4. The thermal blocking sheet of claim 2 or claim 3, wherein at least one film layer comprises an adhesive tape permitting the sheet to be attached to another component.

5. The thermal blocking sheet of claim 1, wherein the frame extends around the periphery of the sheet; or
 wherein the frame includes at least one intermediate rib.

6. A battery comprising:
 a plurality of cells; and
 a thermal blocking sheet according to any of claim 1, wherein the thermal blocking sheet is adjacent to at least one battery cell, wherein the frame is configured to resist expansion of an adjacent battery cell.

7. A battery according to claim 6, wherein the thermal blocking sheet is positioned between a pair of battery cells.

8. An electrical vehicle comprising a battery according to claim 6 or claim 7.

9. A method of manufacturing a thermal blocking sheet for a battery, the method comprising:
 forming a frame comprising one or more frame elements configured to resist compression of the sheet; and
 disposing thermal insulation within the frame.

10. The method of claim 9, further comprising:
 sandwiching the frame and the thermal insulation between first second film layers.

* * * * *